C. H. HAPGOOD.
HANGING SCALE.
APPLICATION FILED SEPT. 22, 1915.
1,366,880.
Patented Jan. 25, 1921.
2 SHEETS—SHEET 2.
Fig. 2
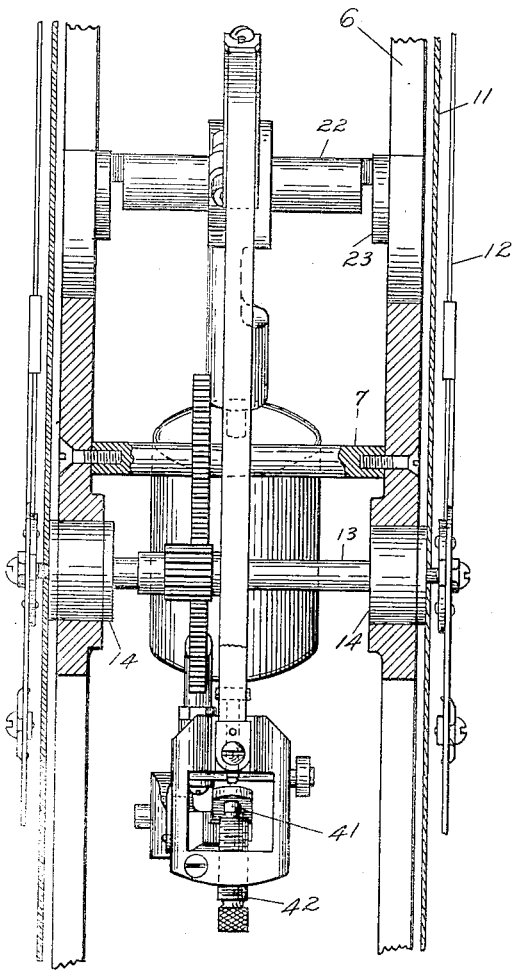
Fig. 3
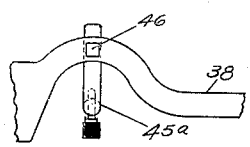
Fig. 4
WITNESSES:
Grant Richard
Carl Zinke
INVENTOR.
Clarence H. Hapgood
BY
George R. Frye
ATTORNEY

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

HANGING SCALE.

1,366,880.　　　　Specification of Letters Patent.　　Patented Jan. 25, 1921.

Application filed September 22, 1915.　Serial No. 51,965.

*To all whom it may concern:*

Be it known that I, CLARENCE H. HAPGOOD, a citizen of the United States, residing at Toledo, in the county of Lucas and State of Ohio, have invented certain new and useful Improvements in Hanging Scales, of which the following is a specification.

This invention relates to gravity scales, and more particularly to pendulum scales of the hanging or suspension type, wherein the weighing and indicating mechanism is mounted within a suspended frame or housing and supports a depending weigh pan or tray. In the accompanying drawings I have illustrated a preferred form of my hanging scale with a double pendulum weighing means, but this is for the purpose of exemplification only, and it will be obvious upon an understanding of the same that my invention is not limited to the specific structure herein shown but may take a variety of other forms and modifications. The scope of my invention is defined in the appended claims in such terms as to distinguish it from the prior art so far as known to me, though it is not my intention to relinquish or abandon any portion of the invention.

Referring now to the drawings,

Fig. 2 is an enlarged vertical section along the line 2—2 of Fig. 1.

Fig. 3 is a detail plan view of the cam forming a part of the pendulum mechanism, and Fig. 4 is a detail plan view of the connection of the dash-pot with the scale mechanism.

Figure 1:
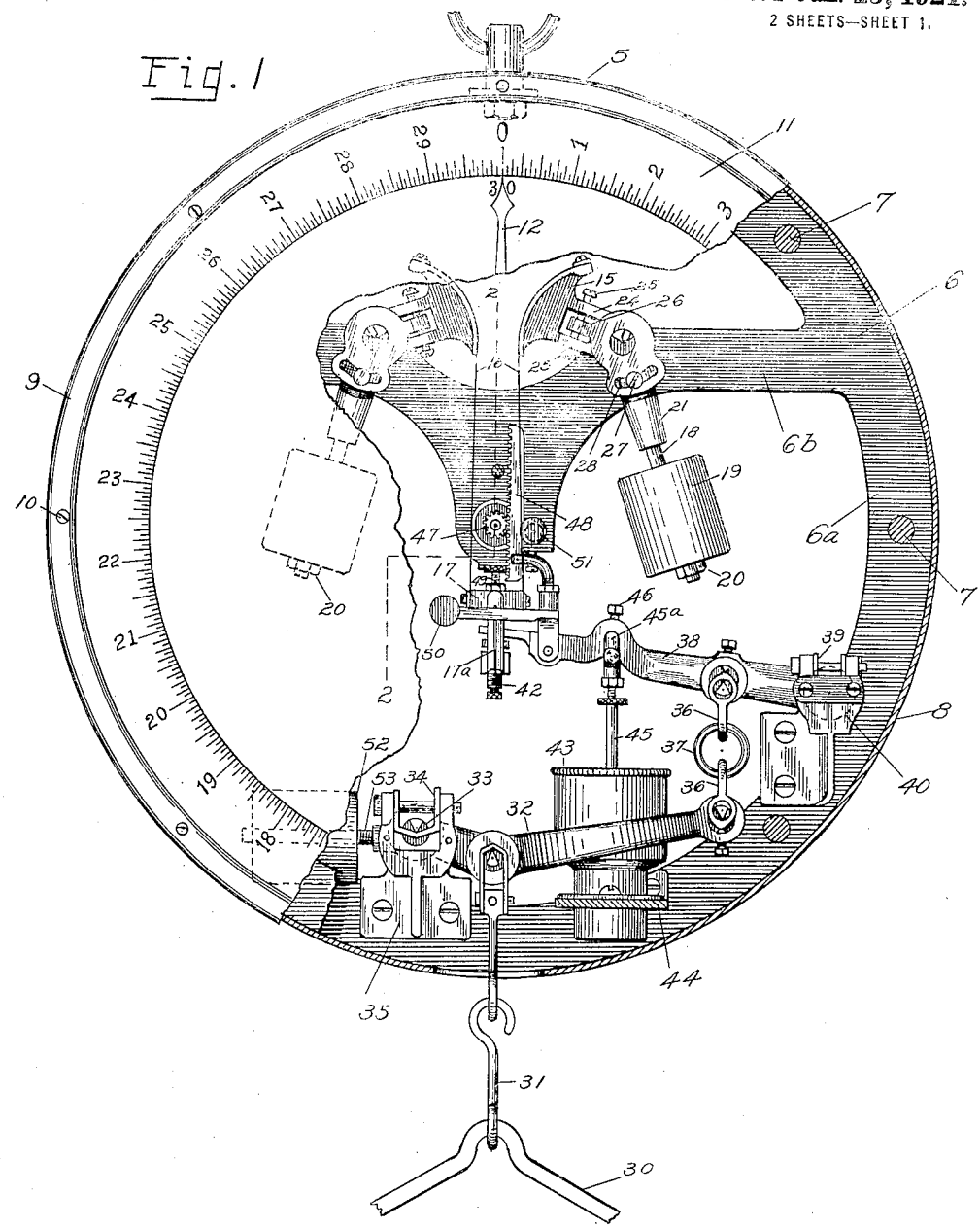
Figure 1 is a front elevation with parts broken away of my improved hanging scale.

As shown in the drawings, the numeral 5 designates the scale housing comprising a pair of similar supporting frames 6 connected by bolts 7 and each formed of an annulus $6^a$ and a crossbar $6^b$ carrying supports for the pendulums and the indicator hand shaft as hereinafter more fully described. An inclosing drum 8 preferably extends across the edges of the annular frames $6^a$ and forms a peripheral support for inclosing glass plates arranged adjacent the dials and indicator hands of the scale in position to exclude dust and foreign material therefrom. Annular scrolls 9 secured by screws 10 to lugs formed on the drum 8 may be employed for retaining the glass plates in position. It will be evident that a dial and indicating hand may be utilized upon opposite sides of the weighing scale if desired, and the scale herein shown is equipped with the double dial for purposes of exemplification, though it is to be understood that either of the dials and indicator hands may be omitted and the scale manufactured with a single indicating means. In the scale herein illustrated, dials 11 and $11^a$ are positioned at opposite faces of the scale and are suitably graduated to show weight indications adapted to co-act with the indicator hands or pointers 12 and $12^a$ secured at the opposite extremities of the indicator shaft 13. The shaft 13 is preferably mounted upon suitable bearings 14 carried by the crossbar $6^b$ of the supporting frames 6.

The load-offsetting mechanism of the scale comprises a pair of oppositely-disposed pendulums, substantially identical in formation, and each mounted upon an elongated bearing shaft 22, the ends of which are formed as knife-edges and seat upon agate bearings 23 carried by the crossbars $6^b$ of the supporting frames 6, the edges of the knife-edge bearings being coincident with the axis of the shaft 22. To each shaft 22 is affixed a pendulum consisting of a casting 21 carrying a stem 18 upon which is adjustably mounted a weight 19, the normal position of the pendulum being substantially as shown in Fig. 1. The weight 19 is preferably threaded upon the stem 18 throughout at least a portion of its length, and is locked in any adjusted position by means of the lock nuts 20. Associated with each casting 21 is a cam 15, the peripheral face of which is formed eccentrically to the axis of the shaft 22, provision for adjustment relatively to the casting 21 being indicated by the arcuate slot 28 and set screw 27, and also by the lug 26 projecting from the casting 21 between spaced arms 24 formed on the cam member 15 and adapted to be contacted by oppositely-extending adjusting screws 25 respectively threaded in the arms 24. By suitably adjusting the screws 25 the pendulum stem may be moved toward or away from a vertical line position as desired, the set screw 27 being loosened before such adjustment is made and then tightened after the desired adjustment has been attained to bind the two pendulum members in their adjusted position. As above stated, the construction of the pendulum load-offsetting members is substantially identical, and a flexible metallic ribbon 16 passes over the peripheral face of each of the cams 15 and is secured at its upper extremity to the cam and at its lower extremity to an equalizer bar 17, as clearly shown in Fig. 1, the equalizer bar being so connected with the lever mechanism of the scale as to freely permit relative tilting movement, as will be hereinafter more fully described. The ribbons 16 are respectively secured on opposite ends of the equalizer bar 17 and to the oppositely-disposed cams 15 so that if the scale be slightly tilted in the plane of the face of the dial and both pendulums thereby shifted in the same direction, it will have no effect upon the operation of the scale since the amount of ribbon taken up by one cam will be compensated for by that given up by the other, the equalizer bar 17 tilting slightly to adjust itself to the unequal lengths of the ribbons. A stirrup 17ª is connected to the equalizer bar 17 and extends at right angles thereto as shown in Fig. 1, the lower arm of this stirrup being threaded to receive the adjustable bearing screw 42 adapted to receive the conical bearing 41 of the scale lever 38, while the upper arm of the stirrup 17ª carrries an adjustable set screw 49 arranged so that its lower extremity is spaced but slightly above the upper surface of the lever 38 to prevent the accidental displacement of the bearing 41 from its seat in the bearing screw 42.

The weigh pan or tray (not shown) is adapted to be suspended by means of its bail 30 from a depending hook 31 supported from knife edge bearings carried by the scale lever 32 intermediate the ends of the lever, as clearly shown in Fig. 1. The scale lever 32 as herein shown is fulcrumed adjacent one end, as at 33, upon bearings 34 mounted in supporting brackets 35 suitably secured to the frames 6 of the scale, and is connected adjacent its opposite end by means of the stirrups 36 and link 37 to an auxiliary lever 38, which is preferably mounted above the scale lever 32 as shown in Fig. 1. The auxiliary lever 38 is fulcrumed at one end upon bearings 39 mounted in supporting brackets 40 carried by the frames 6 of the scale, and adjacent its opposite extremity carries a cone bearing 41 adapted to seat within a conical recess formed in the upper extremity of the bearing screw 42 suitably threaded in the lower arm of the stirrup 17ª forming part of the equalizer bar 17 to which the flexible metallic ribbons 16 are secured.

The lever 32 is formed with spaced arms encircling a dash pot 43 which is supported upon a bracket 44 carried by the frames 6 of the scale. As herein shown the dash pot is formed with a cylinder adapted to contain oil or the like, and the plunger 45 co-acting therewith is adapted to reciprocate within the cylinder to dampen the movement of the auxiliary lever 38, the upper end of the plunger 45 being suitably secured to the lever 38 as by the arm 45ª passing through an aperture in said lever and being retained therein by means of the set screw 46.

The indicating mechanism of the scale will now be described. A pinion 47 is affixed to the indicator shaft 13 and co-acts with a vertically-movable rack 48 which is pivotally connected at its lower extremity with the lever 38, as shown in Fig. 1. A weighted arm 50 serves to bear upon the rack 48 to hold it in close engagement with the teeth of the pinion 47 to prevent lost motion between the rack and pinion, and a guide roller 51 is also mounted between the crossbars 6ᵇ of the frame 6 adjacent the rear extremity of the rack in position to prevent lateral motion of the rack 48. As shown in the modification disclosed, an indicator hand is secured at each end of the indicator shaft 13 and co-acts with the indications upon the graduated dials 11 and 11ª respectively to indicate the weight of a commodity placed upon the weigh pan or tray of the scale.

In the operation of the scale when an article to be weighed is placed upon the weigh pan it depresses the lever 32 and through the link 37 this movement is transmitted to the lever 38 and the equalizer bar 17, the equalizer bar being moved vertically downward and swings the oppositely-disposed pendulums from their normal positions through the medium of the metallic ribbons 16, the pendulums moving to a position counter-balancing the weight of the commodity upon the platform. During the movement of the lever 38 as above described, the rack 48 is moved vertically downward and in its movement rotates the pinion 47 and the indicator hands 12 and 12ª to a position indicating on the dials 11 and 11ª the weight of the commodity on the weigh pan. When the commodity is removed, the pendulums fall from their elevated to their normal positions, returning the levers and indicating mechanism to their original positions.

A sealing weight 52 is adjustably mounted upon the threaded arm 53 extending rearwardly from the fulcrum of the scale lever 32 to permit the sealing of the scale in the usual manner.

By reason of the eccentric peripheral face of the pendulum members 15, we are enabled to secure equal movements of the load-offsetting and indicating mechanisms for equal increments of weight, thereby allowing for equal graduations being inscribed on the dials 11 and 11ª.

From the above it will be apparent that I have provided a pendulum hanging scale that is of extreme simplicity and durability and which may be inexpensively manufactured and maintained in best repair.

Having described my invention, I claim:

1. In a weighing scale of the hanging type, a frame, a pair of pendulums supported thereon, a pair of segments adjustably connected with said pendulums, an equalizer bar, means connecting said bar with both segments, and a pair of levers of the second order connected for transmitting the pull of the load being weighed to the equalizer bar.

2. In a weighing scale of the hanging type, a frame, a pair of pendulums supported thereon, a segment adjustably connected to each of said pendulums, an equalizer bar, means connecting said bar with said segments, a lever fulcrumed on the frame and engaging the equalizer bar, a dash pot mounted upon the frame and connected with said lever, a weigh-pan, and means connecting the weigh-pan with said lever.

3. In a weighing scale, a frame, a pair of pendulums supported thereon, a segment adjustably connected to each of said pendulums, an equalizer bar, means connecting said bar with said segments, a lever fulcrumed on the frame and engaging the equalizer bar, said lever carrying a cone pivot adjacent one extremity, an adjusting screw threaded in the equalizer bar and forming a bearing for said cone pivot, a weigh-pan, and means connecting the weigh-pan with said lever.

4. In a weighing scale, a frame, a pair of pendulums supported thereon, a segment adjustably connected to each of said pendulums, an equalizer bar, means connecting said bar with said segments, a lever fulcrumed on the frame and engaging the equalizer bar, a rack pivotally mounted upon said lever, indicating mechanism actuated upon movement of said rack, a weigh-pan, and means connecting the weigh-pan with said lever.

5. In a weighing scale of the hanging type, a frame, a pair of pendulums supported thereon, a segment adjustably connected with each of said pendulums, an equalizer bar, means connecting said bar with said segments, a lever of the second order fulcrumed on the frame and engaging the equalizer bar, a second lever of the second order fulcrumed upon the frame and connected with the first-mentioned lever, and a weigh-pan suspended from said second lever.

6. In a weighing scale, a frame, a pair of pendulums supported thereon, a segment adjustably connected with each of said pendulums, an equalizer bar, means connecting said bar with said segments, a lever fulcrumed on the frame and engaging the equalizer bar, a second lever fulcrumed upon the frame and connected with the first-mentioned lever, a sealing weight adjustably mounted on said second lever on the opposite side of its fulcrum from its point of connection with the first-mentioned lever, and a weigh-pan suspended from said second lever.

7. In a weighing scale, a frame, a pair of pendulums supported thereon, an equalizer bar, means connecting said bar with said pendulums, a lever fulcrumed upon the frame, means for connecting said lever and said equalizer bar including a conical pivot, a load receiver, and leverage means for transmitting the power of the load being weighed to the lever.

8. In a weighing scale, a frame, a pair of pendulums supported thereon, an equalizer bar, means connecting said bar with said pendulums, a lever fulcrumed upon the frame, means for connecting said lever and said equalizer bar including a conical pivot, a load receiver, and means including a lever having a sealing weight thereon for transmitting to the first-named lever the pull of the load being weighed.

9. In a weighing scale, a frame, a pair of pendulums supported thereon, an equalizer bar, means connecting said bar with both pendulums, and a pair of levers of the second order connected for transmitting the pull of the load being weighed to the equalizer bar, one of said levers being provided with an adjustable sealing weight.

10. In a weighing scale, a frame, a pair of pendulums supported thereon, an equalizer bar, means connecting said bar with both pendulums, a pair of levers of the second order connected for transmitting the pull of the load being weighed to the equalizer bar, a dash pot connected to one of said levers for regulating the vibratory movements of the weighing mechanism, one of said levers being provided with an adjustable sealing weight.

11. In a weighing scale, a frame, a pair of pendulums supported thereon, indicating mechanism, a lever fulcrumed upon the frame, flexible means connecting said pendulums and said lever, means connected to said lever to dampen the vibratory movement thereof, a rack carried by said lever for actuating said indicating mechanism, and means including a supplemental lever having a sealing weight thereon for transmitting to the first-mentioned lever the pull of the load being weighed.

12. In a scale of the hanging type, a pair of pendulums, a pair of levers connected with each other and with the pendulums, a frame, suspending means for the scale secured to the frame, supports formed on the frame for the fulcrums of the levers, and a crossbar carried by the frame for supporting the pendulums.

13. In a scale of the hanging type, a pair of pendulums, a pair of levers connected with each other and with the pendulums, a frame having a substantially circular periphery, suspending means for the scale secured to the frame, supports formed on the frame for the fulcrums of the levers, and a crossbar carried by the frame for supporting the pendulums.

14. In a scale of the hanging type, a pair of pendulums, a pair of levers connected with each other and with the pendulums, a frame having a substantially circular periphery, a dash pot supported on the frame and connected with one of the levers, suspending means for the scale secured to the frame, supports on the frame for the fulcrums of the levers, and a crossbar carried by the frame for supporting the pendulums.

CLARENCE H. HAPGOOD

Witnesses:
F. A. CROWLEY,
GEORGE R. FRYE.